United States Patent
Favichia et al.

(10) Patent No.: US 6,445,716 B1
(45) Date of Patent: *Sep. 3, 2002

(54) METHOD AND APPARATUS FOR DYNAMIC NEGOTIATION OF PROTOCOLS

(75) Inventors: Frank Favichia; Eamon O'Leary, both of Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/634,573

(22) Filed: Aug. 8, 2000

Related U.S. Application Data

(63) Continuation of application No. 08/787,535, filed on Jan. 21, 1997, now Pat. No. 6,125,122.

(51) Int. Cl.[7] .............................. H04J 3/16; H04J 3/22
(52) U.S. Cl. ...................... 370/466; 370/467; 370/469
(58) Field of Search ............................... 370/466, 252, 370/299, 496, 467, 469, 524, 253, 264, 471, 465, 353, 395.6, 395.63, 395.64, 395.65, 400, 401

(56) References Cited

U.S. PATENT DOCUMENTS

| | | | | |
|---|---|---|---|---|
| 4,747,073 A | | 5/1988 | Desbois et al. ............. 364/900 |
| 4,941,143 A | * | 7/1990 | Twitty et al. ................ 370/445 |
| 5,062,108 A | * | 10/1991 | Bales et al. .................. 370/467 |
| 5,142,528 A | * | 8/1992 | Kobayashi et al. .......... 370/469 |
| 5,212,684 A | * | 5/1993 | MacNamee et al. ........ 370/465 |
| 5,231,634 A | * | 7/1993 | Giles et al. .................. 370/445 |
| 5,249,268 A | | 9/1993 | Doucet ........................ 395/200 |
| 5,278,972 A | | 1/1994 | Baker et al. ................. 395/500 |
| 5,297,143 A | * | 3/1994 | Fridrich et al. ............. 370/445 |
| 5,309,562 A | | 5/1994 | Li ................................ 395/200 |
| 5,339,413 A | | 8/1994 | Koval et al. ................. 395/650 |
| 5,420,852 A | | 5/1995 | Anderson ................... 370/58.1 |
| 5,420,867 A | * | 5/1995 | Price et al. .................. 370/524 |
| 5,420,916 A | * | 5/1995 | Sekiguchi ................... 370/467 |
| 5,452,287 A | * | 9/1995 | DiCecco et al. ............ 370/465 |
| 5,452,420 A | | 9/1995 | Engdahl et al. ............. 395/285 |
| 5,452,433 A | * | 9/1995 | Nihart et al. ................ 709/233 |
| 5,539,742 A | * | 7/1996 | Wille et al. .................. 370/522 |
| 5,548,727 A | * | 8/1996 | Meehan ....................... 370/465 |
| 5,557,745 A | * | 9/1996 | Perlman et al. ............. 370/465 |
| 5,586,117 A | * | 12/1996 | Edem et al. ................. 370/466 |
| 5,594,721 A | * | 1/1997 | Pan ............................. 370/465 |
| 5,655,001 A | * | 8/1997 | Cline et al. .................. 370/328 |
| 5,666,359 A | * | 9/1997 | Bennett et al. ............. 370/358 |
| 5,680,552 A | * | 10/1997 | Netravali et al. ........... 370/401 |
| 5,701,120 A | * | 12/1997 | Perelman et al. ...... 340/825.02 |
| 5,754,552 A | * | 5/1998 | Allmond et al. ............ 370/465 |
| 5,790,648 A | * | 8/1998 | Baillis et al. ................ 370/466 |
| 5,818,603 A | * | 10/1998 | Motoyama ................... 358/296 |
| 5,826,017 A | * | 10/1998 | Holzmann ................... 370/466 |
| 5,826,027 A | * | 10/1998 | Pedersen et al. ........ 395/200.51 |
| 5,841,985 A | * | 11/1998 | Jie et al. ...................... 370/468 |
| 5,842,045 A | * | 11/1998 | Nakamura ................... 710/63 |
| 5,864,559 A | * | 1/1999 | Jou et al. ..................... 370/465 |
| 6,125,122 A | * | 9/2000 | Favichia et al. ............. 370/466 |

* cited by examiner

Primary Examiner—Douglas Olms
Assistant Examiner—Phirin Sam
(74) Attorney, Agent, or Firm—Kenyon & Kenyon

(57) ABSTRACT

Two intelligent nodes are provided with the capability of negotiating a protocol between them so that if the intelligent nodes operate at two different protocols then they can select a protocol appropriate for their communication. Furthermore, the intelligent nodes are provided with a locking shift capability so as to select between codesets that are available within a selected protocol.

27 Claims, 4 Drawing Sheets

|  | PROTOCOL VERSIONS | | | MESSAGE TYPE |
|---|---|---|---|---|
|  | C | B | A |  |
| MESSAGE CODE OR ID | 75 | 50 | 1 | REG. NOT. |
|  | 76 | 51 | 2 | LOC. REC. |
|  | 77 | 52 | 3 | OWL DIR. |

| PARAMETER ID | PARAMETER IN CODESET S | PARAMETER IN CODESET S' |
|---|---|---|
| 1 | CALLING NO. | BILLING |

FIG. 5A

| FIELD | VALUE | TYPE | REFERENCE | NOTES |
|---|---|---|---|---|
| IDENTIFIER | PROTOCOL IDENTIFIER IMPLICIT OCTET STRING | 0 | | |
| LENGTH | VARIABLE OCTETS | | | |
| CONTENTS | | | | |

| H | G | F | E | D | C | B | A | OCTET | NOTES |
|---|---|---|---|---|---|---|---|---|---|
| E | SERVICE PROVIDER-MSB | | | PROTOCOL LEVEL | | | | | |
| E | | | | LSB | SERVICE PROVIDER | | | | |

FIG. 5B

PROTOCOL LEVEL (OCTET 1, BITS A, B, C, &D)

| BITS H | G | F | E | D | C | B | A | VALUE | MEANING |
|---|---|---|---|---|---|---|---|---|---|
| | | | | 0 | 0 | 0 | 0 | 0 | NOT APPLICABLE |
| | | | | 0 | 0 | 0 | 1 | 1 | IS-41 REV 0 |
| | | | | 0 | 0 | 1 | 0 | 2 | IS-41 REV A |
| | | | | 0 | 0 | 1 | 1 | 3 | IS-41 REV B |
| | | | | 0 | 1 | 0 | 0 | 4 | IS-41 REV C |
| | | | | 0 | 1 | 0 | 1 | 5 | |
| | | | | | THROUGH | | | | RESERVED |
| | | | | 1 | 1 | 1 | 1 | 15 | |

SERVICE PROVIDER (OCTET 1, BIT E, F, G & OCTET 2 BITS A, B, C & D)

| BITS | D | C | B | A | G | F | E | VALUE | MEANING |
|---|---|---|---|---|---|---|---|---|---|
| | 0 | 0 | 0 | 0 | 0 | 0 | 0 | 0 | NOT APPLICABLE |
| | 0 | 0 | 0 | 0 | 0 | 0 | 1 | 1 | AT&T WS |
| | 0 | 0 | 0 | 0 | 0 | 1 | 0 | 2 | SOUTHWESTERN BELL |
| | | | | | | | | | ETC |

EXTENSION BIT H

| BITS H | G | F | E | D | C | B | A | VALUE | MEANING |
|---|---|---|---|---|---|---|---|---|---|
| 0 | | | | | | | | 0 | THIS IS NOT THE LAST OCTET IN THIS INFORMATION ELEMENT |
| 1 | | | | | | | | 1 | THIS IS THE FINAL OCTET IN THIS INFORMATION ELEMENT |

FIG. 6A

| H | G | F | E | D | C | B | A | OCTET | NOTES |
|---|---|---|---|---|---|---|---|---|---|
| ESCAPE FOR EXTENSION ||||||||  1 | |
| 1 | 1 | 1 | 1 | 1 | 1 | 1 | 1 | | |
| LENGTH OF INFORMATION ELEMENT CONTENTS |||||||| 2 | |
| VARIABLE LENGTH |||||||| | |
| INFORMATION ELEMENT IDENTIFIER: LOCKING SHIFT INFORMATION ELEMENT |||||||| 3 | |
| 1 | 0 | 1 | 0 | 0 | 0 | 0 | 0 | | |
| CONTENTS OF INFORMATION ELEMENT |||||||| 4 | |
| E | LOCK SHIFT | RESERVED || NEW/TEMPORARY CODESET IDENTIFICATION |||| | |

FIG. 6B

```
NEW/TEMPORARY CODESET IDENTIFICATION (OCTET 1, BITS A,B,C & D)
BITS    H  G  F  E  D  C  B  A    VALUE      MEANING
                    0  0  0  0      0        NOT APPLICABLE
                    0  0  0  0      1
                         THROUGH             RESERVED
                    0  1  0  1      5
                    0  1  1  0      6        INFORMATION ELEMENTS SPECIFIC
                                              TO THE HOME NETWORK
                    0  1  1  1      7
                         THROUGH             RESERVED
                    1  1  1  1     15

LOCK SHIFT (OCTET 1, BIT G)
BITS    H  G  F  E  D  C  B  A    VALUE      MEANING
           0                        0        LOCKING SHIFT
           1                        1        NON LOCKING MEANS

EXTENSION BIT
BITS    H  G  F  E  D  C  B  A    VALUE      MEANING
                                             THIS IS NOT THE LAST OCTET
        0                           0        IN THIS INFORMATION ELEMENT
                                             THIS IS THE FINAL OCTET
        1                           1        IN THIS INFORMATION ELEMENT
```

METHOD AND APPARATUS FOR DYNAMIC NEGOTIATION OF PROTOCOLS

This application is a continuation of U.S. patent application Ser. No. 08/787,535, filed Jan. 21, 1997 U.S. Pat. No. 6,125,122.

BACKGROUND OF THE INVENTION

The present invention is directed to a method and apparatus for selecting a communication protocol between nodes in a network. More specifically, the present invention is directed to method and apparatus for dynamically negotiating a protocol between two nodes where at least one of the nodes is capable of operating in at least two different protocols.

It is known in a telecommunication network to provide a plurality of nodes that have varying degrees of intelligence. The nodes are useful in controlling the operation of the network. More specifically, in an environment such as a network for wireless communications, it is often necessary to transfer information about a subscriber and the subscriber's services between various intelligent nodes in the network. In addition, since in a wireless communication scheme a subscriber can roam outside of the subscriber's home network and into another region serviced by other providers, it is also necessary to be able to transfer information between nodes in the subscriber network and the other provider's network.

FIG. 1 illustrates an example of a wireless communication network showing how various intelligent nodes need to communicate with one another to transfer information so as to provide service to a subscriber that has a mobile station.

In the example of FIG. 1, a subscriber has a mobile station 10. The subscriber has a "home" service provider, in this example, AT&T Wireless Services (AWS).

The subscriber's home region is Seattle. Therefore, a Home Location Register (HLR) 11 in Seattle stores subscriber information with respect to mobile station 10, for example, the services to which the subscriber has access, billing information, etc. The HLR 11 is coupled to a signaling transfer point (STP) 13. A mobile switching center (MSC) 12 handles over-the-air communications with the subscriber when she is in her home region.

The subscriber may take the mobile station out of the home region of Seattle and seek service in a number of alternative locations which may or may not be served by her service provider.

For instance, the subscriber could travel to New York and seek service in the New York region. It may so happen that the subscriber's provider also provides service in the New York region. In that circumstance, the mobile station would communicate with an MSC 22 in New York. When the mobile station is turned on in New York, the MSC 22 then sends a query back through the network 20 to the home region, and more specifically to the HLR 11 associated with the mobile station 10.

The intelligent nodes, e.g., 20 and 22 typically transfer information in accordance with a pre-selected protocol. One example of such a protocol is known as IS-41. However, while IS-41 may define generally the type of protocol between the MSCs 22 and HLR 11, it is possible that the system provider has begun to install upgrades of the IS-41 protocol (for example, revision A, revision B, or revision C) throughout that provider's network. Since it is not feasible to install upgrades in each facility simultaneously, there may exist periods in time where various nodes within the system provider's network are capable of operating at different levels of the protocol. For instance, the MSC in New York, 22, could be IS-41 Rev. A, whereas the MSC in Seattle, 12, could have been upgraded to IS-41 Rev. C. An example of the problem that may arise is illustrated in FIG. 2.

FIG. 2 shows that for two different protocol versions the same message type is identified by a different message code, for example, in protocol version A, the message type "Registration Notifications" (RegNot) might be identified by message code 1 while in protocol C, it might be identified by message code 75. Thus, if nothing is done to facilitate the communications between MSC 22 and MSC 12, it is possible that as they communicate message codes between the two nodes the information that is transferred from node 12 to node 22 would not be properly understood.

Protocol differences can also arise, and thereby create problems, when the subscriber activates the mobile station in a region that is serviced by a service provider other than the provider with whom the mobile station subscribes. As shown more specifically in FIG. 1, the mobile station 10 is located in a region so that is serviced by another system operator. When the mobile station is activated an MSC 32 in that region receives the activation request from the mobile station and then creates a query through an interconnect communications network North American Cellular Network (NACN), 40. This query back to the HLR 11 is the same as that which occurred in the first example described above where the mobile station has moved out of its home region but is still being serviced by the same service provider. However, in this scenario it is more likely that the MSC 32 and HLR 11 will be operating with different protocols. In such a circumstance, there is again the possibility of information being lost or mishandled due to the differences in the protocols.

In a different environment, the user to network interface environment, it is known that one terminal (user) can operate at one protocol while another terminal (user) operates at a second different protocol. This environment differs from the network to node environment described above in that no node to node protocol adjustment takes place; the initial network node adapts to the fixed protocol of the end user terminal, but the actual network protocol, i.e., node to node, remains unchanged.

CCITT Volume VI FASCICLE V1.11 (published in 1988) describes that in this user to network interface environment every message will include a protocol discriminator or identifier. This will serve to identify the protocol with which the message is associated. However, there is no mechanism for negotiating a protocol for communications. In fact, if the receiver cannot communicate in the identified protocol the message is simply discarded. The receiver and transmitter do not attempt to find a mutually acceptable communication protocol and again there is the likelihood that communication will be quite limited.

It is therefore desirable to provide a method by which these intelligent nodes operating at different protocols can communicate with one another while reducing the likelihood of losing data or creating some mishandling of information.

SUMMARY OF THE INVENTION

The present invention provides a method for dynamically negotiating a protocol between nodes.

In accordance with an embodiment of the present invention, one establishes a selection of a communication protocol between first and second network nodes by; in a first step, receiving at the second network node, an indication of the operating communication protocol of the first network node; then, based on the indication, a selection is made as to a designated protocol from a plurality of communication protocols at which the second network node is capable of operating. Subsequently, an indication of the designated protocol is sent to the first network node. As a consequence, the two network nodes operate at the same protocol thereby avoiding losses of information and mishandling of information.

In a further embodiment of the present invention, after a protocol has been established between the two network nodes, it is possible that within a selected protocol a plurality of codesets are available. The present invention provides for dynamic selection of a codeset within a selected protocol. In accordance with the selection, it is possible that one of the network nodes can signal to the other network node that it is switching codesets within the protocol and can designate whether it is switching codesets indefinitely or only for the next parameter.

With regard to protocol selection, typically the common protocol level to be used is easily determined by nodes belonging to the same service provider. Typically, this is the lowest (earliest) protocol level. For nodes which belong to different service provider networks, the service providers must agree on how to define a common protocol, for instance it is possible that as between two different providers, if there are differences between protocols, a default or third protocol is selected as the appropriate one for communication between these two nodes.

BRIEF DESCRIPTION OF THE DRAWINGS

FIGS. 5A and 5B show an example of formats for information for identifying a protocol as between nodes and the meaning of the information within the identifier.

FIGS. 6A and 6B illustrate a format of information to be used to select a codeset within a given protocol and the meaning of the information contained in that format.

DETAILED DESCRIPTION

In accordance with an embodiment of the present invention, when two nodes begin to communicate with one another they transmit information to one another identifying a protocol level at which they normally operate. A negotiated protocol is selected for future communications.

The present invention will be described in relation to a registration procedure, that is, the procedure that is undertaken when, for example, the mobile station is first activated in a given region. It should be understood, however, that the invention can be used whenever intelligent nodes must communicate either within a network (intra-network) or across two networks (inter-network).

Figure 1:
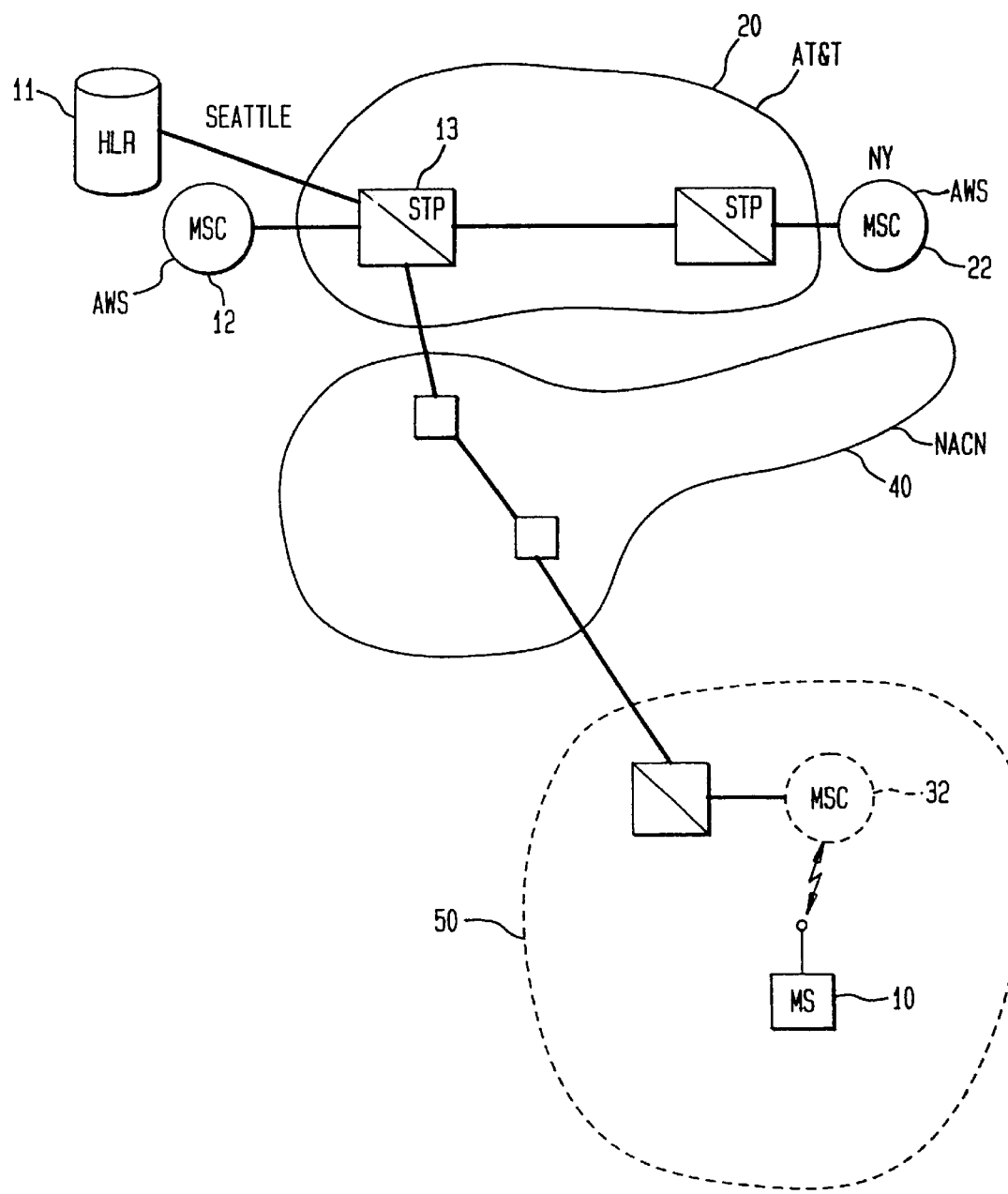
FIG. 1 illustrates an example of a cellular configuration in which the present invention can be employed.

As an example, suppose that in FIG. 1 HLR 11, in a preferred node operates at IS-41 Rev. C but can operate at earlier revisions (e.g., A and B) and MSC 22, in a preferred node operates at IS-41 Rev. A. Furthermore, assume that mobile station 10 is in the New York region (not shown). When the mobile station registers with the MSC 22, that node sends information to HLR 11 in Seattle identifying that it operates at protocol version A. At that point since Rev. C is a later (or higher) version of the protocol, HLR 11 can either send a message back identifying the highest protocol version at which it can operate, or instead, to save registration time, it can simply select Rev. A as the appropriate protocol level since, being a lower protocol level it can be implemented by MSC 22. Having selected Rev. A, the HLR 11 notifies MSC 22 that this will be the protocol for communications.

Figures 2, 3, 4:
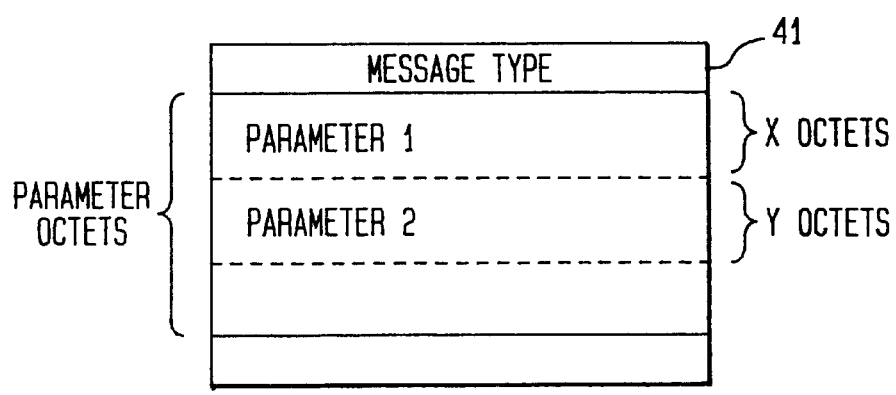
FIG. 2 illustrates an example of differences between levels of the same communication protocol.
FIG. 3 illustrates an example of differences between parameters in different codesets within a given protocol.
FIG. 4 provides a diagram representation of the contents of a message transferred from one node to another within the network shown in FIG. 1.

The nodes accomplish this protocol identification and negotiation sequence by using a parameter in a message transmission. An example of the message configuration is illustrated in FIG. 4. In that configuration, a message will include a message type identifier 41 and a plurality of parameters which each can consist of some number of octets (8 bit groups). In the example in FIG. 4, parameter 1 has X octets and parameter 2 has Y octets.

In accordance with the present invention, one of the parameters associated with the message would be a protocol identifier parameter.

FIG. 5A illustrates an embodiment for such a parameter. The parameter would include a protocol level identified by bits A to D of first octet of the parameter. The next 3 bits of the octet (E to G) correspond to the most significant bits that identify the service provider while bits A to D of the second octet identify the least significant bits of the service provider. The last bit H of the octets indicates whether that particular octet is the last octet in this information element.

In accordance with an example of parameter values shown in FIG. 5B, the intelligent node could identify the protocol associated with that node and the service provider to whom the node belongs. For example, if the protocol identifier parameter includes "0010" bits D to A in the first octet, then the identified protocol is IS-41 Rev. A. Alternatively, if bits D to A are "0100" then this indicates that the protocol is IS-41 Rev. C. Also, in the example of FIG. 1, since both of the intelligent nodes, HLR 11 and MSC 22, are in the AT&T Wireless Services provider system they would have a service provider octet of "0000001" as shown in FIG. 5B.

Alternatively, the registration procedure may be initiated when the subscriber is being serviced by another provider as shown in FIG. 1. Under those circumstances, the MSC 32 of the other cellular carrier would seek to establish communications with HLR 11 via NACN 40. Again, the HLR 11 would look for a protocol identification parameter and select the appropriate protocol for communication.

Once the protocol selection has been established the nodes can conduct further communications in this protocol. It is possible that each node could maintain a database that identifies the protocol associated with its communications with other nodes. In such a circumstance, the database would be updated whenever the node receives a protocol identification parameter from the other node. As an example, HLR 11 having been told that MSC 22 operates at Rev. A. could automatically select that protocol when it initiates communications to that MSC rather than go through a protocol negotiation. This might be particularly advantageous for internetwork communications where the service provider for the HLR may not want to advise the other cellular carrier of the available protocol version if it is not necessary to do so.

The present invention can be adapted to permit an expansion of options within a selected protocol. Specifically, an additional parameter is optionally provided which permits the intelligent node to designate a new codeset for communication in a message transmission. In the current IS-41 standard it is possible to assign up to $2.8 \times 10^{48}$ parameter encoding values. There is adequate flexibility for different operators and vendors to implement proprietary parameters and signals. An example of the differences in codesets is shown in FIG. 3. There, in code set S, parameter ID refers to a calling number while in code set S' the same parameter ID refers to billing. It is therefore desirable to permit a dynamic designation of a codeset for use within the selected protocol. Therefore, the present invention can be modified to provide a Lock Shift procedure that makes the management of proprietary encoding dynamic. Once the sending node has determined the operator of the receiving node, then it can change to a different codeset either temporarily or permanently.

To initiate a Lock Shift, the sending node sends an Escape for Extension parameter. The Escape for Extension is a reserved parameter. The Escape for Extension is followed by the locking shift information element. The locking shift information element defines the new codeset identification and includes a Lock Shift bit. This bit indicates if the new codeset is temporary or permanent. If the new codeset is temporary then the locking shift is in effect for the next parameter only. If the new codeset is permanent, then that new codeset remains in effect until the next locking shift takes place. This is analogous to the operation of a keyboard where a shift key can be operated to enable a given other key to have at least two possible outcomes if depressed. That is, for example, on a keyboard if the shift key is depressed and the key for number "1" is subsequently depressed then a symbol other than "1" will be produced.

FIGS. 6A and 6B provide examples of the format of an Escape for Extension parameter and the value for the parameter. In the parameter of four octets: the first octet identifies the parameter as the escape for extension parameter; the second octet identifies the length of the information element contents; the third octet includes the information element identifier and, in particular, the locking shift information element to identify whether this is a temporary or permanent lock shift; and the fourth octet identifies the contents of the information element. This last octet includes new/temporary codeset identification information.

As shown in FIG. 6B, the four bits D–A in the contents of the information element octet (the fourth octet) identify the new/temporary codeset. Furthermore, bit G of the octet that identifies the locking shift information element indicates whether the locking shift is temporary or permanent.

By employing this locking shift capability, the present invention enables the selection between various available codesets to thereby enhance the capabilities of the selected protocol.

The present invention provides a dynamic protocol negotiation capability and once the protocol is selected, it also permits a dynamic codeset selection. In view of this flexibility, the present invention facilitates the communication between intelligent nodes operating with various protocols and codesets.

What is claimed is:

1. A method for establishing a communication protocol between a first network node and a second network node wherein the second network node is capable of operating at any one of a plurality of communication protocols, the method comprising:

receiving, at the second network node, an indication of the operating communication protocol of the first network node;

based on said indication, selecting as a designated protocol a communication protocol from the plurality of communication protocols, wherein said plurality of communication protocols includes at least two protocols related to each other in that one of said protocols is of a later version than the other protocol;

sending an indication of said designated protocol to the first network node;

selecting a messaging codeset from a plurality of messaging codesets within said designated protocol; and indicating the selected messaging codeset to the first network node.

2. The method of claim 1 wherein said designated protocol corresponds to the indicated operating communication protocol of the first network node.

3. The method of claim 1 wherein said designated protocol corresponds to the protocol of a later version.

4. The method of claim 1 wherein said designated protocol corresponds to the protocol of an earlier version.

5. The method of claim 1 wherein said second network, prior to receiving said indication operates in a first protocol and wherein said designated protocol is a protocol other than said first protocol and the indicated operating communication protocol of the first network node.

6. The method of claim 1 further comprising the step of the second network node receiving, from the first network node, an indication of a selection of a messaging codeset within said designated protocol.

7. The method of claim 1, further comprising: after sending an indication of said designated protocol to the first network node, receiving from the first network node, an indication of a selection of a messaging codeset within said designated protocol.

8. The method of claim 1, further comprising:

after sending an indication of said designated protocol to the first network node, switching to another messaging codeset from said plurality of messaging codeset within said designated protocol; and indicating the switched messaging codeset to the first network node.

9. The method of claim 8 further comprising:

designating that said switched messaging codeset is permanent.

10. The method of claim 8, further comprising:

designating that said switched messaging codeset is for a next parameter.

11. A network node in a communication system comprising:

a receiver that receives an indication of an operating communication protocol from another network node;

a protocol selector that selects a designated protocol from a plurality of communication protocols wherein said plurality of communication protocols includes at least two protocols related to each other in that one of said protocol is of a later version than the other protocol;

means for sending an indication of said designated protocol to the first network node:

means for selecting one of a plurality of messaging codesets within said designated protocol; and means for sending an indication of said selected messaging codeset to the first network node.

12. The network node of claim 11 wherein said designated protocol corresponds to the indicated operating communication protocol of the other network node.

13. The network node of claim 11 wherein said designated protocol is different from the indicated operating communication protocol of the other network node.

14. The network node of claim 11 wherein said node, prior to receiving the indication from the other network node is designated to operate with a first protocol.

15. The network node of claim wherein said designated protocol corresponds to said first protocol.

16. The network node of claim 14 wherein said designated protocol is different from both said first protocol and the indicated protocol of the other network node.

17. The network node of claim 11, further comprising:
means for switching to another messaging codeset from said plurality of messaging codesets within said designated protocol; and
means for indicating the switched messaging codeset to the first network node.

18. The network node of claims 17, further comprising:
means for designating that said switched messaging codeset is permanent.

19. The network node of claim 17, further comprising:
means for designating that said switched messaging codeset is for a next parameter.

20. A method for negotiating a common communication protocol between a first network node operating in a preferred mode at a first protocol and second network node operating in a preferred mode at a second protocol, said method comprising the steps of:
said first network node transmitting an indication of said first protocol to said second network node;
said second network node comparing the indication of said first protocol to an identification of said second protocol, wherein said first protocol is of a later version than said second protocol;
based on said comparison said second network node selecting a communication protocol for communication between said first network node and said second network node;
sending an indication of the selected communication protocol from said second network node to said first network node;
communicating between said first and second network nodes using the selected communication protocol, and
selecting a messaging codeset form a plurality of messaging codesets within the selected communication protocol and identifying the selected messaging codeset to the other one of said first and second network nodes.

21. The method of claim 20 wherein said selected communication protocol corresponds to said first protocol.

22. The method of claim 20 wherein said selected communication protocol corresponds to said second protocol.

23. The method of claim 20 wherein said selected communication protocol corresponds to a third protocol that differs from both said first and second protocols.

24. The method of claim 20 comprising the further steps of storing an identification of the selected communication protocol in association with said first network node and when subsequently initiating communication from said second network node to said first network node referring to the stored identification to select a communication protocol.

25. The method of claim 20 further comprising:
switching to another messaging codeset from said plurality of messaging codesets within said selected communication protocol; and
indicating the switched messaging codeset to the other one of said first and second network nodes.

26. The method of claim 25 further comprising:
designating that said switched messaging codeset is permanent.

27. The method of claim 25 further comprising:
designating that said switched messaging codeset is for a next parameter.

* * * * *

UNITED STATES PATENT AND TRADEMARK OFFICE
CERTIFICATE OF CORRECTION

PATENT NO.     : 6,445,716 B1
DATED          : September 3, 2002
INVENTOR(S)    : Frank Favichia et al.

It is certified that error appears in the above-identified patent and that said Letters Patent is hereby corrected as shown below:

Column 7,
Line 7, change "claim wherein" to -- claim 14 wherein --.

Signed and Sealed this

Twenty-seventh Day of July, 2004

JON W. DUDAS
*Acting Director of the United States Patent and Trademark Office*